US008567195B2

(12) United States Patent
Nash

(10) Patent No.: US 8,567,195 B2
(45) Date of Patent: Oct. 29, 2013

(54) DEEP OCEAN ENERGY SYSTEM WITH FULL SEA WATER AIR CONDITIONING AND UTILITY WASTE HEAT UTILIZATION

(75) Inventor: Christopher Evan Nash, Sandys (BM)

(73) Assignee: Ocean Synergy Limited (BM)

( * ) Notice: Subject to any disclaimer, the term of this patent is extended or adjusted under 35 U.S.C. 154(b) by 0 days.

(21) Appl. No.: 13/237,589

(22) Filed: Sep. 20, 2011

(65) Prior Publication Data

US 2012/0091729 A1    Apr. 19, 2012

Related U.S. Application Data

(63) Continuation of application No. PCT/IB2010/000751, filed on Apr. 1, 2010.

(60) Provisional application No. 61/168,082, filed on Apr. 9, 2009.

(51) Int. Cl.
| F03G 7/04 | (2006.01) |
| F03G 7/06 | (2006.01) |
| F01K 25/08 | (2006.01) |
| F25D 23/12 | (2006.01) |

(52) U.S. Cl.
USPC .............. 60/641.7; 60/641.1; 60/651; 62/260

(58) Field of Classification Search
USPC .................. 60/614–624, 641.1, 641.6, 641.7, 60/645–681; 62/260; 165/45
See application file for complete search history.

(56) References Cited

U.S. PATENT DOCUMENTS

| 4,417,446 A * | 11/1983 | Nakamoto et al. ........... 60/641.7 |
| 4,726,191 A | 2/1988 | Kawamura |
| 5,513,494 A | 5/1996 | Flynn et al. |
| 5,967,085 A | 10/1999 | Kawamura |

(Continued)

FOREIGN PATENT DOCUMENTS

| DE | 3245865 A1 | 4/1984 |
| GB | 278762 A | 6/1928 |
| KR | 100765356 B1 | 10/2007 |

OTHER PUBLICATIONS

Song, et al.; "Effects of Utilizing Seawater as a Cooling Source System in a Commercial Complex"; Energy and Buildings 39 (2007) p. 1080-1087.

(Continued)

Primary Examiner — Kenneth Bomberg
Assistant Examiner — Christopher Jetton
(74) Attorney, Agent, or Firm — St. Onge Steward Johnston & Reens LLC

(57) ABSTRACT

An air conditioning system for tropical and sub-tropical island sea coast environments having access to deep ocean sea water. Sea water from depths of at least about 1200 feet, at a temperature of 47° F. or lower, is utilized as a source for circulating chilled water loops providing district wide air conditioning, in some instances with assistance from electrically driven chillers. The sea water is then further used to condense working fluid in a low temperature Organic Rankine Cycle or Kalina Cycle turbine generator, the heat source for which is the cooling jacket of a diesel engine generator, and also to condense working fluid in a steam driven Rankine Cycle turbine generator, the heat source for which is exhaust heat from the diesel engine. Alternate heat sources, if available, can be utilized. Additional electrical generation from these sources far exceeds the costs of pumping the sea water.

11 Claims, 2 Drawing Sheets

(56) References Cited

U.S. PATENT DOCUMENTS

| | | |
|---|---|---|
| 6,539,718 B2 | 4/2003 | Bronicki et al. |
| 7,712,326 B2 * | 5/2010 | Jagusztyn et al. .............. 62/260 |
| 2007/0068160 A1 * | 3/2007 | Jagusztyn et al. ........... 60/641.6 |
| 2008/0314043 A1 | 12/2008 | Howard et al. |

OTHER PUBLICATIONS

International Search Report and Written Opinion of the International Searching Authority; Application No. PCT/IB2010/000751; Issued: Nov. 24, 2011; Mailing Date: Dec. 1, 2011; 10 pages.

\* cited by examiner

DEEP OCEAN ENERGY SYSTEM WITH FULL SEA WATER AIR CONDITIONING AND UTILITY WASTE HEAT UTILIZATION

CROSS-REFERENCE TO RELATED APPLICATIONS

The present application is a continuation of pending International patent application PCT/IB2010/000751 filed on Apr. 1, 2010 which designates the United States and claims priority of U.S. Provisional Application 61/168,082 filed on Apr. 9, 2009, the content of which is incorporated herein by reference.

FIELD OF THE INVENTION

This invention relates to the field of air conditioning particularly for tropical and subtropical island and sea coast environments where low temperature sea water may be extracted efficiently from substantial ocean depths and utilized on land as a source of cooling and air conditioning.

BACKGROUND OF THE INVENTION

The use of cold sea water for carrying out cooling and air conditioning in island and coastal areas is, in general, well known. However, existing procedures for this purpose involve unnecessary inefficiencies and costs. The present invention is directed to new and improved systems and procedures which not only provide the desired cooling and air conditioning but also enable significantly greater efficiencies in related electrical energy generation, thus reducing the effective overall costs of air conditioning and power generation as compared to existing procedures, and thus rendering the basic sea water cooling concepts much more attractive and economically justified.

SUMMARY OF THE INVENTION

This invention relates to novel processes that utilize very cold sea water taken from great depths, typically in excess of 1500 feet, in a sequential arrangement that, in a primary stage, makes maximum use of the cold energy available from this source to provide efficient cooling and air conditioning of substantial geographical areas and large buildings. The system of the invention, in one or more important secondary procedures, serves to extract energy in a highly efficient manner from available thermal energy sources for operation of Organic Rankine Cycle, or Kalina Cycle systems, and steam driven Rankine Cycle power generation equipment, such that the energy gains derived from the secondary systems greatly exceed the costs of operating the air conditioning systems. The thermal energy sources referred to above include waste heat from utility diesel electricity generators, typically found in abundance in island environments where power is generated locally. Pursuant to one aspect of the invention, such waste heat can be more efficiently extracted and utilized than heretofore, to significantly increase the operating efficiency of the power generating systems and thus of the system as a whole.

The arrangement of processes according to the invention is targeted particularly at tropical and sub-tropical islands and other coastline areas that have ready access to deep sea water, preferably in excess of 1,500 feet depth, within several miles of the coast line. In particular cases, however, where the air conditioning load of an area is small in relation to its electrical generation requirements, it is feasible to utilize water taken from somewhat shallower depths, for example 1200 feet, while still realizing significant enhancements of operating efficiencies.

BRIEF DESCRIPTION OF THE DRAWINGS

The following written description is to be considered in conjunction with the accompanying drawings schematically illustrating exemplary embodiments of the invention and in which.

DETAILED DESCRIPTION OF THE INVENTION

Figure 1:
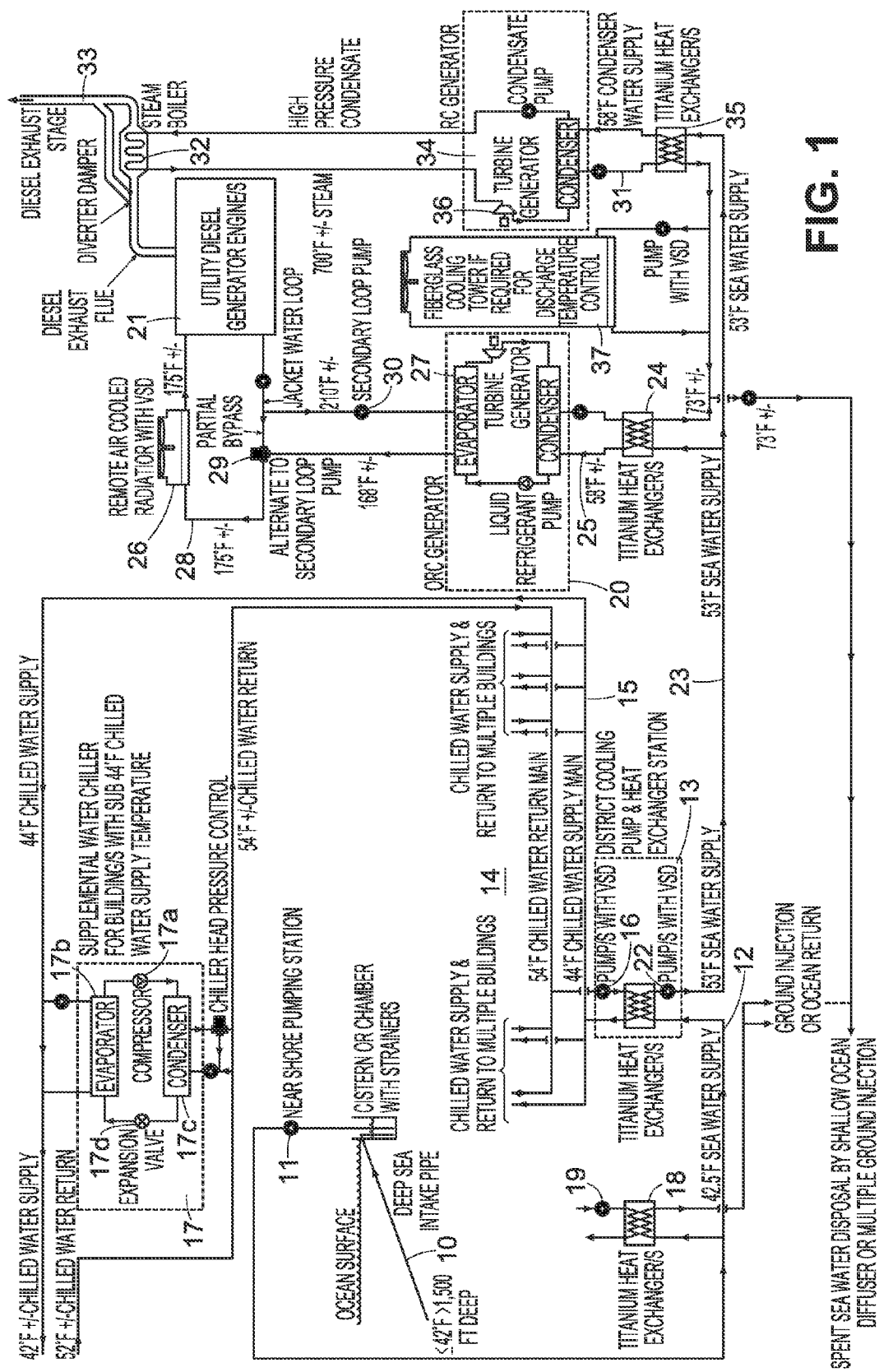
FIG. 1 is a schematic illustration of an energy-efficient, sea water based cooling and air conditioning system according to the invention where chilled sea water can be obtained in a practical manner from ocean depths of about 1500 feet or greater.

The first described process, which is illustrated in FIG. 1, is designed to operate in areas where the air conditioning requirements are large in relation to electrical generation requirements and is designed to utilize sea water derived from the maximum depths, which may be about 1500 feet or deeper. We have named these processes Deep Ocean Energy System with Full Sea Water Air Conditioning (DOES with Full SWAC).

The initial stage of the process (Stage 1) involves using sea water air conditioning (SWAC) for a district-wide air conditioning system, instead of conventional electrically driven chillers. In general, this stage of the process is known. One or two systems are in operation worldwide, another is under construction and at least one more is in the design stage. In Stage 1 of the process, cold sea water at a temperature of 41° F.-43° F., and preferably 42° F. or lower, is pumped from the deep ocean via long suction pipes 10 to a pumping station 11 just inshore from the coast line. The shore side pumping station 11 consists of one or more pumps with strainers to catch any fish and other marine life accidently sucked into the intake pipe before pumping the sea water further ashore.

Deep sea water at depths in excess of 1,500 feet maintains a fairly constant cold temperature all year round, even in tropical locations. The depth at which the desired 42° F. water is consistently found varies, however, with different geographical locations. For example, in Bermuda, it may be found at depths of around 4200 feet. The level at which the desired sea water temperature is to be found can easily be determined empirically at any location of interest.

From the discharge of the deep water pumps at the pumping station 11, the sea water is further pumped in pipes 12 to one or more heat exchangers 13 that use the cold sea water to cool down return inflowing heat transfer fluid (typically chilled water) from air conditioning systems in nearby buildings (not shown) served by a district-wide cooling system 14. Where these buildings are all in close proximity to each other, a bank of heat exchangers 13 in one location can serve all of the buildings on a district-wide loop 15 for the chilled cooling water. Pumps 16 for the chilled water loop 15 can be located adjacent to the heat exchanger bank 13.

Due to small thermal gains in the intake and transfer pipes 10, 12, etc., the sea water typically may be at approximately 42.5° F. when it gets to the heat exchangers 13. This cold sea water is pumped through the heat exchangers to cool the district cooling loop water on the outflow side of the loop 15 from approximately 54° F. to approximately 44° F., depending on the desired chilled water supply temperature for the buildings to be served on the loop 15. Where there are a minority of buildings requiring the chilled water supply to be at even lower temperatures, such as 42° F., either the intake pipe 10 can be taken deeper into the sea, to reach cooler water, or those selected buildings can use supplemental chillers 17 to cool their chilled water from 44 degrees down to 42 degrees. The supplemental chillers 17 include compressors 17a, evaporators 17b, condensers 17c, expansion valves 17d and circulating refrigerant. A desired portion of the outflowing chilled water for the selected buildings is passed through the evaporator 17b to further reduce the temperature of the chilled water to a desired lower level. Likewise, a desired portion of the inflowing water from the selected portion of the loop 15 is passed through the condenser 17c to condense the circulating refrigerant. Suitable by-pass controls are provided for regulating the desired proportionate flow through the respective evaporator and condenser units 17b, 17c.

The chilled water in the loop 15 supplies the cooling for each building's air conditioning system, with BTU meters (not shown) being provided to record the energy used by each building for billing purposes. Where the distance between the buildings is too great to be served effectively by a common district loop, the cold sea water can be separately piped to individual remote buildings served by the system and each remote building would have its own heat exchangers 18 and chilled water pumps 19. Again there would be BTU metering at each building for billing purposes.

The sea water leaving the heat exchangers 13 or 18 typically will be approximately 53° F., assuming full air conditioning load for the buildings and below 53° F. when operating at part air conditioning load.

The cold deep sea water is a huge renewable energy source. Typically, known SWAC systems can save approximately 90% of the energy that otherwise would be used by conventional electric, engine or steam driven chiller systems. The 10% energy that is not typically renewable is represented by the pumping energy required to move the sea water and to operate the chilled water systems and is an operating cost experienced in running known systems. Using the procedures and systems of the invention, however, enough additional energy generation can be realized to recover that cost and in most instances generate far more electricity for other uses.

Unlike conventional SWAC systems that return the sea water coming out of the heat exchangers back to the sea or inject it into the ground, the process of the present invention utilizes the sea water discharged from the cooling and air conditioning stage (sometimes referred to as "rejected" sea water) in a unique manner in subsequent electrical generation stages to derive further important electrical energy production and savings.

A second process stage (Stage 2) of the invention involves using rejected sea water from Stage 1 heat exchangers 13 as the heat sink for one or more low temperature closed cycle generating systems as, for example, Organic Rankine Cycle (ORC) turbine generators 20 as illustrated and described herein, or Kalina cycle generators. In the process of the invention, the heat source for driving the low temperature generating (e.g., ORC) units typically and advantageously is the jacket cooling water from one or more diesel engine-driven electric generators 21, as these are often located in close proximity to the SWAC load in tropical and semi tropical islands. Where the diesel engines are also using the same coolant loop for intercoolers, to cool their combustion air after being compressed by exhaust driven turbine compressors, this additional heat source also can be used for driving the low temperature units 20. Other hot water heat sources for driving ORC and/or Kalina cycle generators could include low temperature geothermal wells, for example.

Additional pumps 22 and piping 23 are used to transfer the partially warmed sea water, typically at a temperature of about 53° F., from the Stage 1 heat exchangers 13 to Stage 2 heat exchangers 24 associated with the ORC or Kalina turbine generators 20, which in turn typically are located near the diesel generators 21. The sea water in the heat exchangers 24 will cool the water in fresh water condenser loops 25 to approximately 56° F. before returning the condenser water to the condensers 25a on the low temperature turbine generator sets 20. The jacket cooling water from the diesel generators 21, which would normally go directly to an air cooled radiator 26 for cooling by the ambient air, is diverted through the evaporators 27 of the low temperature units to boil the refrigerant in the evaporators before returning to the jacket water cooling loops 28. This diversion through the evaporators 27 can be done either by three way mixing valves 29 or by variable speed secondary pumps 30. The evaporated refrigerant drives the ORC/Kalina turbines before being condensed in the condensers 25a and then pumped back to the evaporators 27. The portion of the sea water used to cool the condenser water loops 25 typically will be heated to a temperature of between 70 and 90° F. after passing through the heat exchangers 24. Based on a jacket water discharge temperature of 210° F. and a condenser loop temperature into the ORC low temperature units of about 56° F., the manufacturer of the ORC units which we expect to use initially in this process estimates that 263 net kW of power can be derived from every 4.61 MW of diesel generator capacity. This equates to 5.7% of additional electricity generation from a given amount of fuel consumed by the generators, derived from the procedures and systems of the invention by utilization of heat from the jacket water cooling loops of the diesel generators.

The Organic Cycle Rankine turbines 20 are closed cycle systems designed to operate with organic fluids that are readily evaporated at the temperatures of a diesel jacket water system (e.g., 200° F.-210° F.). For example, the refrigerant used in the ORC can be R245fa (Pentafluoropropane) or other refrigerant with similar boiling point characteristics. For ORC systems operated with such refrigerants, the temperature of the sea water, as received from the Stage 1 procedures (e.g., approximately 54° F.), provides a very favorable temperature differential for efficient operation of the ORC units. Kalina Cycle systems are closed cycle turbine generating systems in which the operating fluid is a mixture, for example of 70% ammonia and 30% water. The ammonia-water operating fluid has variable boiling and condensing temperatures well suited for efficient operation at temperature levels in the typical ranges involved in the system of the invention (e.g., diesel jacket water system temperatures).

A third stage (Stage 3) of the new system involves using the warmed ("rejected") sea water from Stage 1 heat exchangers 13, either in parallel with Stage 2, or in some cases in series with Stage 2, to cool condenser water loops 31 utilized as the heat sinks for further turbine generators. Where the heat source for the Stage 3 process is the exhaust gas from the diesel engines 21, as in the illustrated system of FIG. 1, the further turbine generators can be either additional Organic Rankine Cycle (ORC) turbine generators, or standard Rankine Cycle steam turbine generators, or both. The high temperature diesel exhaust gas serves to make either high temperature hot water under pressure, or steam, or both, by means of waste heat boilers 32 installed in the exhaust gas stream 33 of the diesel engine 21. Where the waste heat boilers 32 are producing hot water, this would then be sent to additional or Kalina Cycle units as their heat source. Where the waste heat boilers 32 are operated to produce steam, the steam would be sent to one or more Rankine Cycle units 34 as their heat source. Other sources of the steam heat could include geothermal wells, for example.

The use of Rankine Cycle turbine generators as bottoming cycles for diesel generators is well known and somewhat widespread, but the use of the reliable and renewable cold deep sea water as the heat sink for such generators is both novel and substantially more energy efficient than other alternatives for tropical island locations.

Where the Stage 3 heat exchangers 35 are operating in parallel with those of Stage 2, as illustrated in FIG. 1 of the drawing, the sea water will cool the fresh water condenser loops 31 to approximately 56° F. before returning the condenser water to the condensers on the turbine generator sets. An ORC or Kalina Cycle in Stage 3, if used, would operate as in Stage 2. Standard (i.e., steam cycle) Rankine Cycle units would be operated by turning water into steam in the boilers 32, directing the steam through turbines 36 which drive generators, condensing the steam in condensers using water cooled by the sea water after its use in Stage 1 heat exchangers 13, and then pumping the condensed water back to the boilers 32.

In Island locations where the SWAC cooling load is relatively small in comparison to the capacity of the associated electrical generation station, the sea water for cooling Stage 3 steam cycle Rankine units can be taken from the discharge of the heat exchangers 24 from Stage 2. This would make the sea water path sequential through all three Stages. In such cases, the upper temperature limit for the sea water entering the Stage 3 heat exchangers 35 should be approximately 78° F. Otherwise there would be insufficient thermal efficiency advantage in Stage 3 over more conventional condenser cooling methods for tropical and sub-tropical islands.

While we have not performed precise calculations on the amount of energy that can be recovered in Stage 3, our conservative estimate is that at least 8.25% of the generator rated output could be recovered during this process. This is in addition to the generator output recovered in Stage 2 by the ORC/Kalina Cycle units.

In some geographical locations the ratio of chilled water energy required for cooling and air conditioning to the utility waste heat available is lower than in areas where the full version is practical. For such locations, a somewhat modified form of the new procedure can be utilized to advantage. We have named this modified procedure as the Deep Ocean Energy System with Partial Sea Water Air Conditioning (DOES with Partial SWAC). The modified procedure, like the Full SWAC procedure described above, is targeted at tropical and sub-tropical islands and other coastline areas that have ready access to deep sea water in typically in excess of 1,200 feet depth, within several miles of the coast line.

Figure 2:
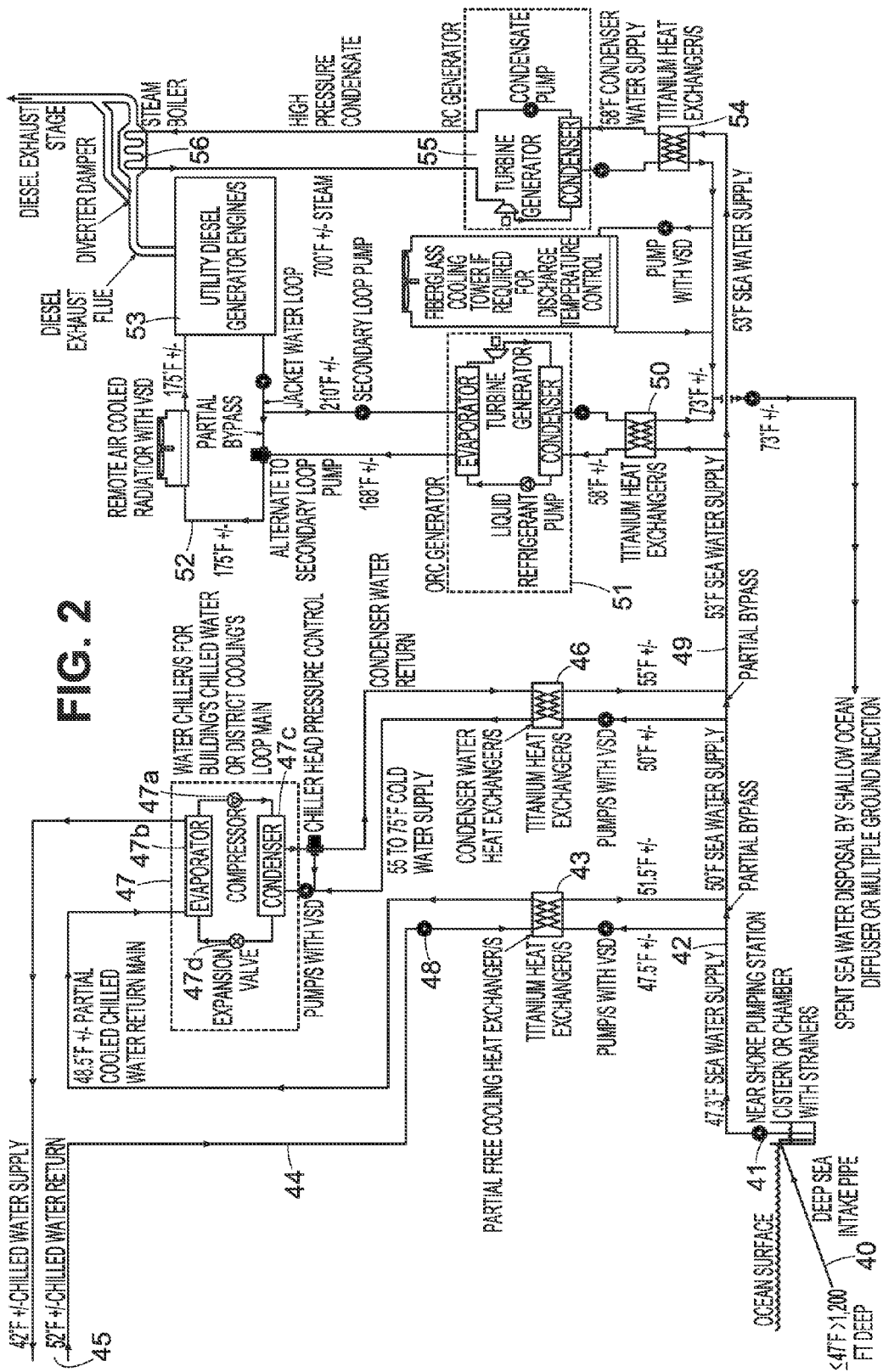
FIG. 2 is a schematic illustration of an energy efficient system similar to that of FIG. 1, but where chilled sea water is obtained from a lesser depth generally in excess of 1200 feet and thus is at a somewhat higher temperature than the water used in the procedure of FIG. 1.

The modified procedure, illustrated in FIG. 2 of the drawings, includes an initial stage (Stage 1) which typically involves using sea water air conditioning (SWAC) for a local or district air conditioning system. The cold sea water, in the Partial SWAC procedure, can be at a somewhat more elevated temperature, for example 47.5° F. or lower (typically about 47° F.), in view of the lighter air conditioning load in relation to available waste heat from generators or other sources. The sea water for the modified procedure is drawn from the deep ocean via long suction pipes 40 to a pumping station 41 just inshore from the coast line. Deep sea water at depths in excess of 1,200 feet maintains a fairly constant cold temperature all year round, even in tropic locations. The depth at which the 47° F. water is consistently found may, however, vary with different geographical locations, and the proper depth can be empirically determined at the location of interest. The shore side pumping station 41 consists of one or more pumps with strainers, to catch any fish and other marine life accidentally drawn into the intake pipe before the sea water is pumped further ashore.

From the pumping station 41, the sea water is pumped in pipes 42 and then a portion of it is supplied to one or more heat exchangers 43 that use the cold sea water to partially cool down inflowing chilled water being returned in pipes 44 from the air conditioning systems in the buildings served by a district cooling system designated generally by the numeral 45.

Due to thermal gains on the intake pipe etc., the 47° F. sea water typically will be approximately 47.5° F. when it gets to the heat exchangers 43. The circulating return chilled water, from the inflow side of the loop 45, which may be at a temperature of approximately 54° F. when arriving at the heat exchanger 43, is cooled therein to a temperature of approximately 48.5 F. The outflowing chilled water is directed through the evaporators 47(b) of chillers 47, having compressors 47a, evaporators 47b, condensers 47c, expansion valves 47d and a circulating refrigerant. This further cools the partially cooled water to approximately 44° F. for supply to the district buildings' air conditioning systems. The chilled water in the outflowing side of the loop 45 supplies the cooling for each building's air conditioning system, with individual BTU meters (not shown) to record the energy used by each building for billing purposes.

A second heat exchanger or set of heat exchangers 46 in the sea water flow path then uses a portion of the partially warmed sea water (now at a temperature of about 50° F.) to cool a coolant loop connected to the condensers 47c of chillers 47, which typically may be electrically driven. Where the district buildings are all in close proximity to each other, a group of heat exchangers 43, 46 in one location could serve all of the buildings on one district chilled water loop 45, with the chilled water pumps 48 for the loop being located adjacent to the heat exchanger bank. Desirably, the pipe 42 supplying the first and second heat exchangers 43, 46 includes suitable by-pass controls between inlet and outlet connections to the heat exchangers, such that controlled portions of the incoming sea water may by-pass these heat exchangers as desired for optimum temperature control of the sea water supply flowing downstream of the heat exchangers.

The sea water leaving the second set of heat exchangers 46 will be approximately 55° F. assuming full building air conditioning loads.

Because the condensers 47c for the water cooled chillers 47 are provided with low temperature water from the heat exchangers 46, the chillers will be far more efficient than any air or conventional water cooled chiller in these tropical or sub-tropical locations. The described hybrid system can typically use as little as 25 to 35% of the electric energy used by conventionally cooled chillers.

In the Partial SWAC process as shown in FIG. 2, the sea water flowing in the piping 49 downstream of the heat exchanger 46 is at a temperature of about 53 F, which is approximately the same temperature as that flowing in the piping 23 of the Full SWAC process of FIG. 1. This can be controlled by partially bypassing controlled amounts of sea water at the respective heat exchangers 43 and 46, as illustrated in FIG. 2. Appropriate valve and/or pump controls (not shown) will control the bypass flow such that the rejected water from the second heat exchanger 46, which typically may be at a temperature of about 55° F., will mix with bypass water to provide a temperature of approximately 53° F. for the combined stream.

Inasmuch as the sea water in piping 49, downstream of Stage 1 of the Partial SWAC process, is at substantially the same temperature as the sea water in the piping 23, at the same Stage of the Full SWAC process of FIG. 1, it will be understood that the sea water in piping 49 can be used in Stage 2 and Stage 3 processes, in the same manner as in the Full SWAC process of FIG. 1. Thus, in the system of FIG. 2, the partially heated sea water flowing in the piping 49 is directed to a heat exchanger 50 for an ORC or Kalina Cycle turbine generator unit 51 driven by the water jacket cooling system 52 of a utility diesel generator unit 53. A branch of the piping 49 supplies the partially used sea water to a further heat exchanger 54 to cool the condenser of a standard (steam cycle) Rankin Cycle generator 55. The Rankin Cycle unit 55 is powered by a waste heat boiler 56 in the exhaust stack of the diesel generator 53.

Thus, in the Partial SWAC system of FIG. 2, significant efficiency gains are realized in the Stage 2 and Stage 3 processes, generally corresponding to those achieved in the Full SWAC system of FIG. 1. These important benefits are achieved in the Partial SWAC system notwithstanding that the basic air conditioning load may be much smaller, in relation to the electrical generating capacity, than in a Full SWAC system.

In situations in which the Partial SWAC system can be employed, a considerable savings can be realized in capital costs because the intake piping system 40 can be extended to a lesser depth, perhaps as little as 1200 feet, where water can be found at constant temperatures of 47° F. or, at most about 47.5° F. Where the air conditioning load is relatively small in relation to the available waste heat from electrical generation and other sources, very significant energy savings can be realized notwithstanding the use of sea water at a somewhat higher temperature than in the Full SWAC process.

In either the Full SWAC of Partial SWAC systems, after the sea water has passed through the final process, it can be piped back into the sea at a moderate depth of perhaps 250 feet or more, or injected into the ground where the rock is highly permeable and no fresh water aquifer exists, subject to environmental impact studies. Additionally, inasmuch as the sea water from the deeper ocean tends to be nutrient rich, it can also be used for aquaculture before being disposed of. Other possible uses include desalination. None of these uses after Stage 3 are, however, part of this invention.

Typical characteristics of tropical and sub-tropical islands lend them to the use of an enhanced deep ocean energy system according to the invention. The invention is directed to a technology that is primarily aimed at providing a renewable energy solution and significantly greater electrical generation efficiency in many tropical and sub-tropical islands. Many of these islands have access to the cold deep sea water within several miles of the coast, which is critical for the intake pipe economics. This is in contrast to many large land masses, whose continental shelves can extend dozens or even hundreds of miles from the coast, thereby preventing economic access to the deep sea depths.

Many tropical and sub tropical Islands are hot and humid for most, if not all of the year. Therefore, buildings on these islands tend to use large amounts of electric energy for air conditioning for most of the year. These islands also tend to use diesel driven generators to produce electricity, more so than in larger countries. Typically all the diesel fuel has to be imported by ship, so electricity on these islands is often a few times more expensive than in mainland locations. Furthermore fresh water is scarce and therefore very expensive on many of these islands, thus precluding the widespread use of cooling towers or direct fresh water cooling for bottoming cycles. For the same reason, most buildings on these islands use air cooled, electrically driven chillers for their air conditioning, which are relatively inefficient at the high ambient temperatures, compared to water cooled units more frequently used in mainland applications. The surface sea water in most of these islands is warm all year round, and thus it does not provide a sufficiently cool heat sink to enable ORC or Kalina Cycle units to be driven by diesel jacket water as per the Stage 2 procedure of the present invention, because the difference in temperature between the heat sink and the heat source would be too low for economical ORC or Kalina Cycle operation. The cold deep sea water used in the Stage 2 processes provides year-round efficient operation of the low temperature units in Stage 2, for tropical and sub-tropical islands and similar areas, which would not otherwise be possible with either air cooled or conventional water cooled heat sinks, including cooling towers. It should be understood, of course that the fundamental teachings of the invention would accommodate the use of other low temperature, closed cycle systems that may be developed and is not limited in principle to ORC or Kalina Cycle systems. In this respect, acceptable low temperature closed cycle systems appropriate for this invention should be able to operate with evaporator temperatures as low as 212° F. and lower, as may be available from the cooling jacket system of a diesel generator or from low temperature geothermal sources, for example.

For corrosion protection and longevity of mechanical components, the heat exchangers should be titanium plate and frame type units and the sea water pumps should be of fiberglass construction wherever practical, or corrosion resistant alloy. Sea water and chilled water piping should be non metallic wherever practical, such as HDPE, PVC etc.

If environmental impact studies find that the rejected sea water from Stage 3 will be too warm to be discharged back into the ocean, or for ground injection, fiberglass cooling towers 37 can be used to cool the water back to within a few degrees of the ambient wet bulb temperature.

Whereas conventional SWAC systems are approximately 90% efficient, with the remaining 10% representing pumping energy and thermal losses, the systems of the invention can generate sufficient electric energy to power all the pumps involved plus generate substantial additional electrical energy for other uses or to feed back into the utility grid. Thus under the invention the SWAC system achieves 100% thermal efficiency, with abundant excess electric energy as a side benefit.

The novel system of the invention involves a combination of using a renewable energy resource (cold sea water) in a direct way, in the air conditioning systems, in conjunction with using the same resource in one or more subsequent stages to greatly improve the efficiency of diesel driven generation facilities on many tropical and sub-tropical islands. Unlike many more widespread renewable energy technologies such as wind and solar, the systems of the present invention offer continuous output in response to demand. Moreover, unlike other renewable technologies such as biomass or other processes that burn a renewable source, the process of the invention does not have any carbon emissions for the energy produced from it.

Of particular importance to many smaller tropical islands, the processes of the invention have very low land use requirements compared to many other renewable energy technologies.

It should be understood, of course, that the embodiments of the invention herein illustrated and described are intended to be representative of typical and advantageous forms of the invention. Reference should therefore be made to the following appended claims in determining the full scope of the invention.

What is claimed is:

1. A method of deriving efficient air conditioning and electrical power generation in tropical and sub-tropical island and coastal environments, for area-wide air conditioning systems and related electrical generation facilities having a waste heat output, which comprises
    (a) extracting sea water from substantial ocean depths to obtain low temperature sea water at temperatures not substantially above 47.5° F.,
    (b) directing said low temperature sea water in a first stage through a first heat exchanger,
    (c) directing a heat transfer fluid from said air conditioning system through said first heat exchanger to be cooled by said low temperature sea water in said first stage,
    (d) in a subsequent stage, directing sea water heated by and discharged from said first heat exchanger to a subsequent heat exchanger to reduce the temperature of cooling fluid circulating in said subsequent heat exchanger,
    (e) providing a closed cycle low temperature Organic Rankine Cycle or Kalina Cycle turbine generator including a low temperature evaporator and a low temperature condenser,
    (f) utilizing waste heat output from said electrical generation facilities to heat a working fluid for said closed cycle turbine generator in said evaporator for driving said turbine generator to generate electrical power, and
    (g) directing cooling fluid from said subsequent heat exchanger to said condenser for condensing the working fluid of said closed cycle turbine generator.

2. The method of claim 1, wherein
    (a) said electrical generation facilities comprise an internal combustion engine and associated generator,
    (b) said waste heat output comprises at least one of a jacket or intercooler cooling loop for said internal combustion engine,
    (c) cooling fluid from said cooling loop is directed to said low temperature evaporator, and
    (d) cooling fluid from said subsequent heat exchanger is directed to said low temperature condenser.

3. The method of claim 2, wherein said internal combustion engine is a diesel engine.

4. The method of claim 1, wherein
    (a) first and second closed cycle turbine generators are provided,
    (b) said first closed cycle turbine generator comprises said low temperature Organic Rankine Cycle or Kalina Cycle unit,
    (c) said electrical generation facilities comprises an internal combustion engine and associated generator,
    (d) said waste heat output comprises in part at least one of a jacket or intercooler cooling loop for said internal combustion engine,
    (e) cooling fluid from said cooling loop is directed to said low temperature evaporator,
    (f) cooling fluid from a first subsequent heat exchanger is directed to said low temperature condenser,
    (g) said second closed cycle turbine generator is a Rankine, Organic Rankine, or Kalina Cycle unit having an associated second evaporator and second condenser,
    (h) said waste heat output comprises in part an exhaust heat boiler associated with an exhaust system of said internal combustion engine,
    (I) heated medium from said exhaust heat boiler is directed to said second evaporator to drive said second closed cycle turbine generator unit for the generation of electrical energy, and
    (j) cooling fluid from a second subsequent heat exchanger is directed to said second condenser.

5. The method of claim 1, wherein
    (a) said sea water is extracted from a depth in excess of about 1500 feet and at a temperature not substantially above 42° F.

6. The method of claim 1, wherein
    (a) said air conditioning system includes a loop for the flow of said heat transfer fluid, said loop including an outflow side extending from said first heat exchanger and an inflow side returning to said first heat exchanger,
    (b) a supplemental chilling unit including a compressor, an evaporator, an expansion valve, a condenser and a refrigerant, and
    (c) said outflow side of said loop is directed in part through the evaporator of said chilling unit for reducing the temperature of the outflowing heat transfer fluid therein, and
    (d) said inflow side is directed in part through said condenser of said chilling unit.

7. The method of claim 1, wherein
    (a) said sea water is extracted from a depth in excess of about 1200 feet and at a temperature above 42° F. but not substantially above 47.5° F.,
    (b) said air conditioning system includes a loop for the flow of said heat transfer fluid, said loop including an outflow side extending from said first heat exchanger and an inflow side returning to said first heat exchanger,
    (c) a supplemental chiller is provided for the heat transfer fluid, including a compressor, an evaporator, a condenser and a refrigerant, and heat transfer fluid outflowing from said first heat exchanger is directed through the chiller evaporator to further reduce the temperature of said outflowing heat transfer fluid,
    (d) sea water is directed to pass through a second heat exchanger separate from said first and said subsequent heat exchangers, and
    (e) fluid is directed through an output loop of the second heat exchanger to the chiller condenser to cool chiller refrigerant.

8. The method of claim 7, wherein
    (a) sea water that is directed to pass through said second heat exchanger includes, as a substantial portion thereof, sea water that has passed through said first heat exchanger.

9. The method of claim 7, wherein
    (a) sea water is directed to pass through said first and second heat exchangers in series, and
    (b) controlled portions of said sea water are caused to by-pass one or both of said first and second heat exchangers for maintaining control of the temperature of said sea water downstream of said first and second heat exchangers.

10. A method of deriving efficient air conditioning and electrical power generation in tropical and sub-tropical island and coastal environments, for area-wide air conditioning systems and related electrical generation facilities having a waste heat output, which comprises
    (a) extracting sea water from substantial ocean depths to obtain sea water at temperatures not substantially above 47.5° F., (b) directing said sea water in a first stage through a first heat exchanger,
(c) directing a heat transfer fluid from said air conditioning system through said first heat exchanger to be cooled by said sea water in said first stage,
(d) directing sea water in a subsequent stage from said first heat exchanger to a subsequent heat exchanger,
(e) providing a closed cycle turbine generator including an evaporator and a condenser,
(f) utilizing waste heat output from said electrical generation facilities to heat a working fluid for said closed cycle turbine generator in said evaporator for driving said turbine generator to generate electrical power, and
(g) directing cooling fluid from said subsequent heat exchanger to said condenser for condensing the working fluid of said closed cycle turbine generator,
(h) said closed cycle turbine generator being a steam driven Rankine Cycle unit having an associated Rankine Cycle condenser unit,
(i) said electrical generation facilities comprising an internal combustion engine and associated generator,
(j) said waste heat output comprising an exhaust heat boiler associated with an exhaust system of said internal combustion engine,
(k) steam from said exhaust heat boiler being directed to said Rankine Cycle unit for the generation of electrical energy, and
(l) cooling fluid from said subsequent heat exchanger being directed to said Rankine Cycle condenser.

11. The method of claim 10, wherein
(a) a low temperature Organic Rankine Cycle or Kalina Cycle turbine generator unit having a low temperature evaporator and a low temperature condenser is provided, in addition to the steam driven Rankine Cycle unit,
(b) hot medium under pressure from said internal combustion engine is directed to said low temperature evaporator for the generation of electrical energy by said Organic Rankine Cycle or Kalina cycle unit, and
(c) cooling fluid from a sea water cooled heat exchanger is directed to said low temperature condenser.

\* \* \* \* \*